US006328498B1

(12) United States Patent
Mersch

(10) Patent No.: US 6,328,498 B1
(45) Date of Patent: Dec. 11, 2001

(54) UNIVERSAL FLEXIBLE SHEATH WITH BELLOW FOR ARTICULATED JOINT AND EQUIPMENT FOR FIXING SAME

(76) Inventor: Patrick Mersch, 265 avenue de Mazargues, F-13008 Marseilles (FR)

( * ) Notice: Subject to any disclaimer, the term of this patent is extended or adjusted under 35 U.S.C. 154(b) by 0 days.

(21) Appl. No.: 09/341,726

(22) PCT Filed: May 22, 1998

(86) PCT No.: PCT/FR98/01027

§ 371 Date: Jul. 16, 1999

§ 102(e) Date: Jul. 16, 1999

(87) PCT Pub. No.: WO99/25985

PCT Pub. Date: May 27, 1999

(30) Foreign Application Priority Data

Nov. 19, 1997 (FR) .................................................. 97 14747

(51) Int. Cl.[7] ...................................................... F16J 15/50
(52) U.S. Cl. ........................................... 403/175; 277/636
(58) Field of Search ................................... 464/173, 174, 464/175; 277/636; 285/299; 280/93.511

(56) References Cited

U.S. PATENT DOCUMENTS

| 3,623,340 |   | 11/1971 | Maas .         |         |
|-----------|---|---------|----------------|---------|
| 4,145,896 | * | 3/1979  | Pringle        | 464/175 |
| 4,559,025 | * | 12/1985 | Dore           | 464/175 |
| 4,730,834 | * | 3/1988  | Ukai et al.    | 277/636 |
| 4,826,466 | * | 5/1989  | Triquet        | 464/173 |
| 4,844,486 | * | 7/1989  | Shiemann       | 277/636 |
| 4,878,389 | * | 11/1989 | Boge           | 464/175 |
| 4,927,678 | * | 5/1990  | Lallement      | 464/175 |
| 5,006,376 | * | 4/1991  | Arima et al.   | 464/285 |
| 5,027,665 | * | 7/1991  | Hayward        | 464/175 |
| 5,094,894 |   | 3/1992  | Schafferus et al. . |    |
| 5,176,390 | * | 1/1993  | Lallement      | 464/175 |
| 5,236,394 | * | 8/1993  | Collins et al. | 464/175 |
| 5,672,113 | * | 9/1997  | Tomogami et al.| 464/175 |
| 5,765,837 | * | 6/1998  | Schwarzler     | 277/636 |
| 6,089,574 | * | 7/2000  | Sadr et al.    | 277/636 |
| 6,227,748 | * | 5/2001  | Hayward et al. | 464/175 |

FOREIGN PATENT DOCUMENTS

| 19510598 | 9/1996 | (DE) . |
| 0425864  | 5/1991 | (EP) . |
| 0794347  | 9/1997 | (EP) . |
| 2717342  | 9/1995 | (FR) . |
| 2727644  | 6/1996 | (FR) . |

* cited by examiner

Primary Examiner—Lynne H. Browne
Assistant Examiner—Kenn Thompson
(74) Attorney, Agent, or Firm—Greenblum & Bernstein, P.L.C.

(57) ABSTRACT

The invention concerns a universal flexible sheath with bellow for articulated joint and equipment for fixing said sheath. The protective sheath consists of a tubular element (4, 5, 6, 7, 8) with fixing zones at its ends and a central conical bellow (1), whereof the folds comprise sloping flanks forming an angle of 0 to 45° with the sheath axis on the large diameter side and of 60 to 80° on the small diameter side, said sheath being associated with flexible or ductile mounting cones whereof the base diameter is variable. The invention concerns equipment for repair shops and the sheath is designed for protecting lubricated joints for transmitting movement to mobile members, and in particular to transmission elements in motor vehicles.

33 Claims, 2 Drawing Sheets

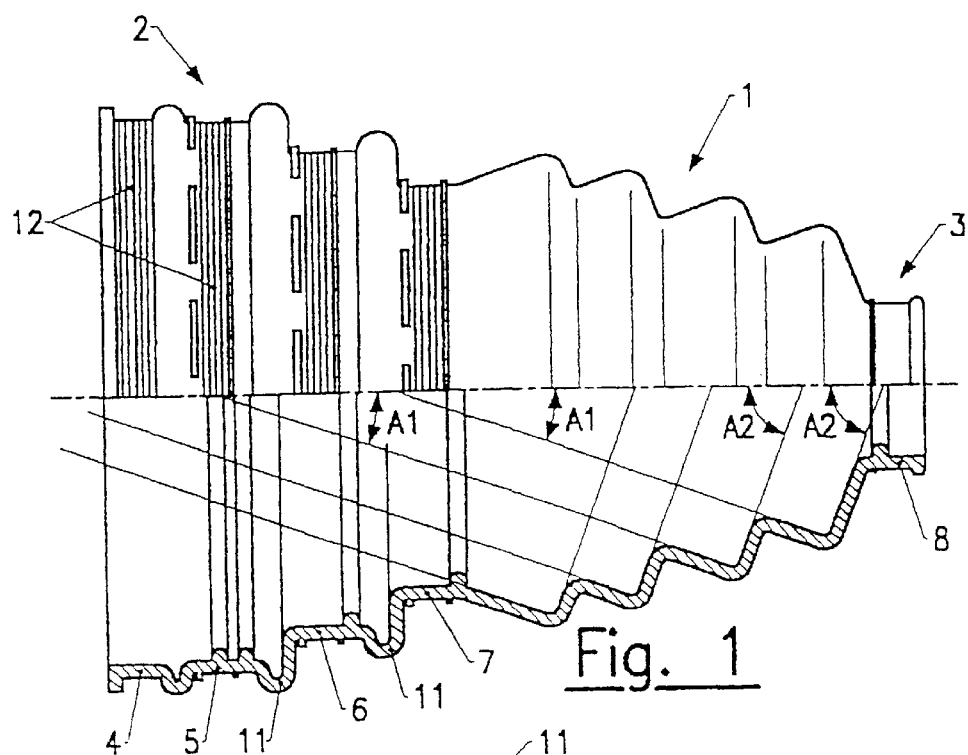
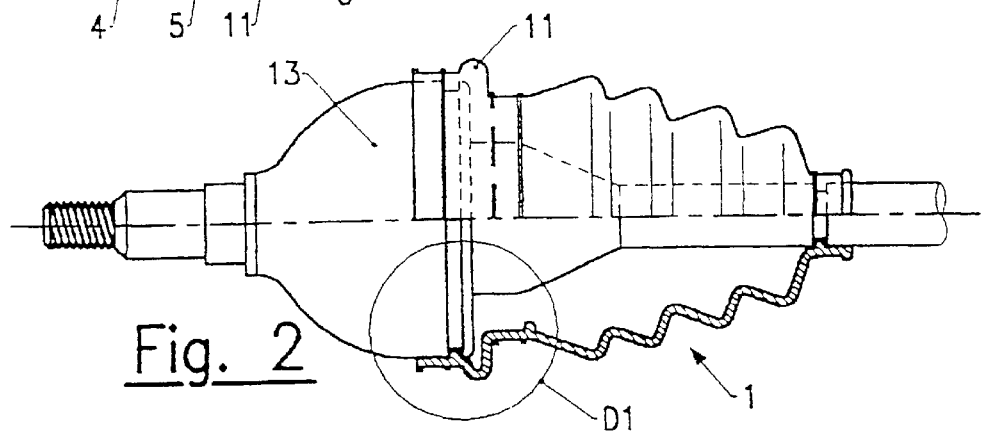
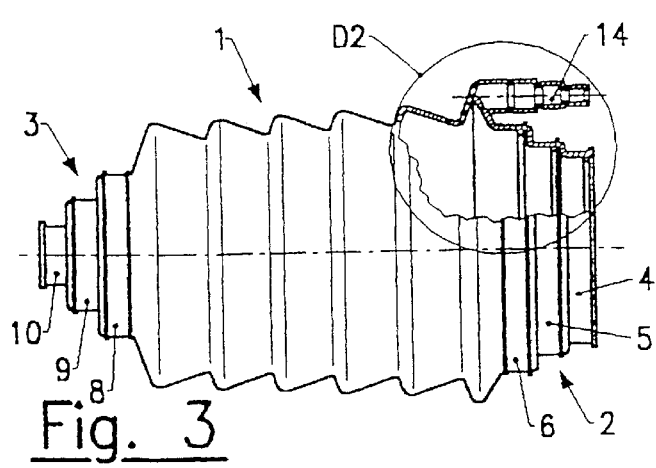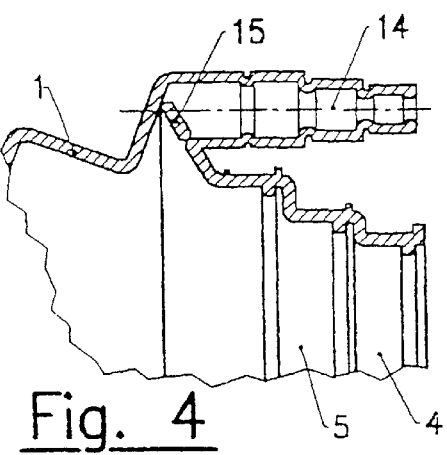

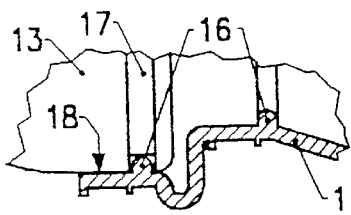
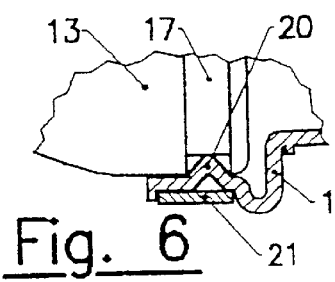
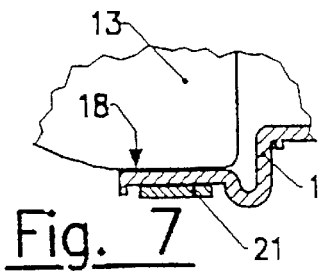
Fig. 5    Fig. 6    Fig. 7
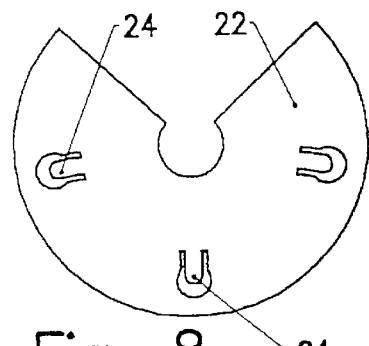
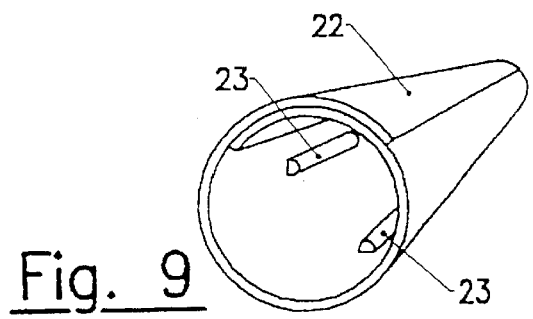
Fig. 8    Fig. 9
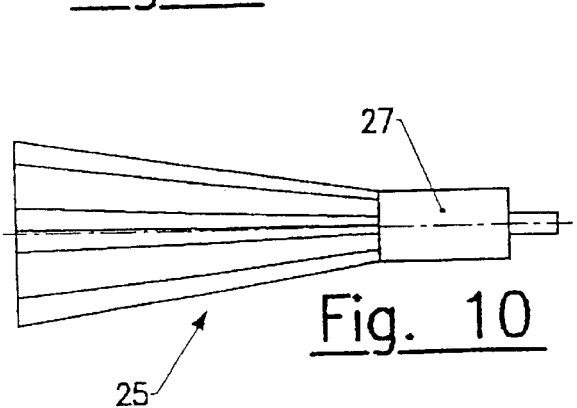
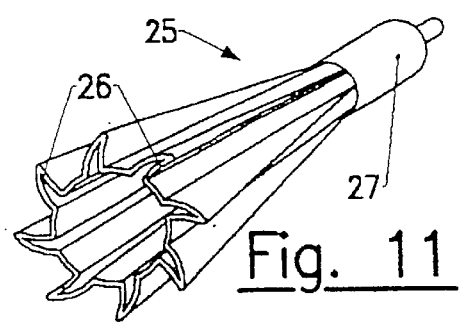
Fig. 10    Fig. 11
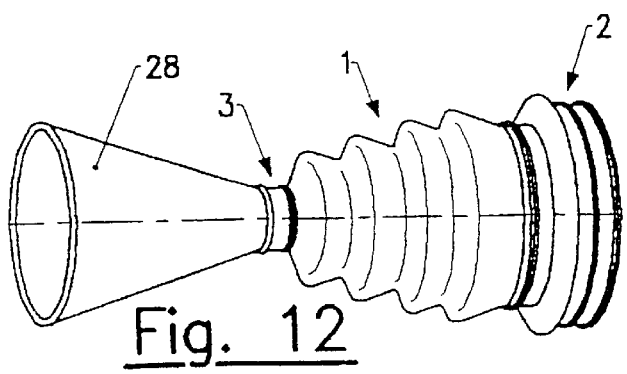
Fig. 12

UNIVERSAL FLEXIBLE SHEATH WITH BELLOW FOR ARTICULATED JOINT AND EQUIPMENT FOR FIXING SAME

BACKGROUND OF THE INVENTION

1. Field of the Invention

The invention relates to a universal flexible sheath with bellows for an articulated joint and a device for insalling the same.

The invention relates to the industrial and commercial area of the manufacture and distribution of equipment for motor vehicle repair and maintenance shops. The sheath is used for protecting lubricated joints such as universal joints, constant velocity joints, three-ball-and-trunnion universal joints, ball joints, socket joints, or similar joints used for transmitting movement to mobile members. The installiation device can be adapted to all types of protective sheaths, and particularly to those used for mechanical transmission components such as steering racks.

Protective sheaths for articulated joints serve for protecting the articulations against foreign bodies, impacts and other external elements. They also serve to contain in a leakproof manner, the lubricating mass that the mechanism needs in order for it to last.

The sheath utilizes by a tubular element made of rubber or flexible elastomer, which can be conventionally molded in a single piece and formed of a conical central part having ridges that permit flexing and axial extension of the body. The tublar element has two ends, each having cylindrical fixing zones with an inner diameter enabling the ends to be attached to the corresponding components of the articulated joint. The ends will also utilize grooves which act as forming seats intended for receiving clamping devices so as to ensure the leak tightness of the assembly.

2. Description of Background and Relevant Information

Most sheaths are specific for each application, particularly for outfitting new vehicles. In order to reduce the number of references on the replacement market, some models are "universal", i.e. they can be mounted on a wide range of articulated joints having different diameters and lengths. This "universality" is achieved, specifically, by means of multiple, stepped fixing zones, as disclosed in patent document EP 0 339 387, for example, which relates to a protective bellow for the articulated joints of a mechanical transmission. The sheath utilizes several fixing zones of different diameters at each end.

In use, the protective sheaths are subject to constant distortion in length and inclination, while also being subject to rotations of very variable speed. Under the effect of centrifugal force and distortion of the wall of the sheath, the lubricating substance tends to migrate away from the parts of the joint near the axis of rotation and the articulation mechanisms, which, in case of leakage or improper filling, may seriously compromise the functioning or life of the joint.

In the case of replacement sheaths, and in order to avoid disassembling the transmission assembly, installing the protective sheaths in its proper position is generally done by means of a rigid hollow mounting cone with or without expander rings, such as those described in patent document FR 2 727 644. This reference presets a sheath installing device comprising a hollow cone whose base may be expanded as needed by means of a series of conical rings mounting up on the cone, the dimensions of which correspond to the different diameters of the articulated joints to be equipped with a protective sheath.

The base of the cone is placed around the spherical mounting or "bowl" that is the largest diameter element of the articulated joint, onto which the bellow is slid by forcing so as to move it far enough for its widest end to come into position on the periphery of the element. In this manner, the cone serves to facilitate the intense stretching that the bellows must undergo. When it reaches the end of the cone, the sheath retracts suddenly to assume a position on the proper side of the bowl or spherical mounting.

These conventional cones are both rigid and cumbersome; they require different diameters depending on the universal joints found in the market, and are, therefore, relatively expensive.

SUMMARY OF THE INVENTION

The invention makes it possible to provide protective sheaths for articulated joints in which the distortion of the outer wall causes drifting of the grease contained in the sheath in the direction of the greater diameter of the sheath, i.e., toward the area where the mechanical elements requiring lubrication are located (brackets, joints, mechanical bearings, etc.). The invention also provides a sheath installation device in the form of a mounting cone that is both adaptable and minimally cumbersome for installing sheaths.

The invention provides a protective sheath having a tubular element with fixing zones at the ends and a conical central bellows, the folds of the bellows have sloping flanks forming an angle of 0 to 45° with the sheath axis on the large diameter side of the sheath and of 60 to 80° on the small diameter side, so that the distortion of the sheath causes a back flow of the grease toward the large diameter end. The sheath may be connected to the flexible or ductile mounting cone wherein the base diameter is variable.

BRIEF DESCRIPTION OF THE DRAWINGS

In the attached drawings, provided by way of example but not limiting the embodiments of the object of the invention, FIG. 1 is an axial half section of a protective sheath for transmission joint, FIG. 2 shows a sheath of the same type, at a different scale, mounted on an articulated joint, FIG. 3 shows a side view of a protective sheath for steering rack, FIG. 4 is an enlarged view of detail D2 of the previous figure, FIG. 5 is an enlarged view of detail D1 of FIG. 2, FIGS. 6 and 7 show, in the same conditions, a variant of a sheath that can be mounted on transmission joints with or without a peripheral groove as an attachment rib, respectively, FIG. 8 shows a flat view of a foil that can be wrapped to form a mounting cone for a protective sheath, FIG. 9 shows the foil of FIG. 8 after being wrapped, FIGS. 10 and 11 are side and perspective views, respectively, of an extensible mounting cone, and FIG. 12 shows a mounting cone made integral with the protective sheath.

DETAILED DESCRIPTION OF THE INVENTION

The sheath, FIGS. 1 through 5, has a tubular sleeve made of a flexible material resistant to lubricants, such as rubber or elastomer, and has three parts: a central, conical, flexible, and extensible bellows 1 and two ends 2, 3 allowing the sheath to be mounted in a leak tight manner on the articulated joint.

The ends 2 and 3 form fixing zones having a small and a large diameter, respectively, each having one or more essentially cylindrical elements 4, 5, 6, 7 and 8, 9, 10 of different inner diameters, equipped with outer grooves for accommodating a clamp that ensures the leak tightness of the assembly. These cylindrical elements may be connected to each other by means of ductile ridges 11.

The outer support surfaces of the clamp may be smooth or, they may have circular grooves 12 transmitting differential compressions, resulting in better leak tightness.

The folds of the sheath 1 have sloping flanks along angles that are asymmetric with respect to the longitudinal axis of the sheath: on the one hand, on the large diameter side, angles A1 ranging from 0 to 45° and, on the other hand, on the small diameter side, angles ranging from 60 to 80° with respect to the same longitudinal axis. When the sheath is subject to rotation or bending movements, the grease that is in the sheaths which are known in the art, tends to leak from the articulation 13 and move toward the small diameter of the sheath. However, in the sheath of the invention, the grease is pushed back toward the articulation. In fact, the open angles A2 (60 to 80°) tend to form a mobile barrier, while the closed angles A1 (10 to 30°) promote the passage of the lubricant.

Makers of vehicles, which are equipped with power steering provide vents to equalize the pressure differences that exist between the two protective sheaths with bellows mounted at each end of the steering rack. These vents are linked to each other by tubes having variable diameters and configurations, which depend on the vehicle model. In all known cases, these tube vents are connected to the protective sheaths, or cross through them. The adaptable sheaths conventionally available on the market do not have an opening or attachment for these tube vents. The difficulty with the conventional sheaths lies in the great disparity of mounts selected by the vehicle makers, and in the complexity of molding a protective sheath that is truly adaptable.

The protective sheaths according to the invention intended for steering racks are equipped with a flexible connector 14 located so that it can be connected to the great majority of tube vents of vehicles currently on the market. The open end of this connector has several sections of different diameters that make it possible to connect the different tubes that exist on the market to it, by simple means of clamping. The other end is closed to allow the sheath to be mounted on mechanical steering racks that, consequently, do not have a vent. This closure is obtained by means of a cap 15 made integral with the sheath during molding. This cap can easily be removed or pierced by the installer in cases of power steering, such as when there is a tube vent, so that it is made to communicate with the inside where it is used on the sheath (FIGS. 3 and 4).

In order to be economically viable, the assembly must be made in one piece, by simple injection or by injection-blow forming in conventional equipment opening in two planes. This is made possible by the positioning and shape of the flexible connector 14 and, particularly, by the position of the cap 15 which is made integral with the wall of the sheath.

The inner surface of conventional protective sheaths has, in general, cylindrical fixing elements 4 through 10, which can be circular attachment ribs 16 generally placed at the middle of each support surface. These ribs are intended to engage in peripheral grooves 17 provided on the "bowl" 13 of the articulated transmission joints or steering racks. Very often, these grooves are positioned near the edge of the joint at issue, such that the support surface 18 of the cylindrical element is partly offset. In order to avoid the risk of dismantling, the attachment ribs 16 of the protective sheaths according to the invention are displaced toward the bellow 1 so that the clamps bear on a flat area and cannot tilt (FIG. 5).

Some bowls 13 of articulated joints, or racks, do not have a peripheral groove 17. In order to be truly universal, replacement sheaths must be able to adapt in all cases. If the inner fixing surface of the sheath has an attachment rib 16, it is difficult to mount it on a smooth surface; in the opposite case, fixing will be more secure by reason of the small bearing surface of bowls having a peripheral groove.

In order to permit the protective sheath according to the invention to adapt to all types of bowls or racks, whether they have a peripheral groove 17 or not, some fixing areas 4–10 advantageously will have a V-shaped annular fold 20 pointing toward the inside, instead of and in place of an attachment rib, the shape of which is determined so that it permits the fold to penetrate into the peripheral groove 17 of the elements that have one (FIG. 6), or to the contrary to open out and become flattened when the clamp 21 is fixed in cases of the elements having a smooth outer surface (FIG. 7). The folds 20 will preferably be framed by two flat cylindrical areas bearing on the outer surface of the bowl or racks case.

Rigid mounting cones are known in the art and will advantageously be replaced by devices for installing the sheath that adapt automatically to the diameter of each bowl 13 of a transmission joint or steering rack case.

The first embodiment of this automatic cone has a simple circular semi-rigid foil 22, made of thermoplastic for example, cut out from a flat sheet, pierced by a hole at the center, and split along a radius or cut in a pie shaped sector. This foil is then wrapped to assume a conical shape which, when placed onto the transmission joint or steering arm, makes it possible to install the protective sheath smoothly. To prevent the conical foil from passing to the other side of the bowl 13 or spherical mounting of the steering along with the sheath, stops that can be molded 23, or the stops can be flexible strips 24 cut in the foil 19. Depending on the quality selected by the maker, this simple foil can then be discarded or reused after use (FIGS. 8 and 9).

Another embodiment of an automatic mounting cone comprises an extensible semi-rigid cone 25 having a section of hollow sawteeth 26 along all or part of its length. These sawteeth relax or retract as a function of the diameter of the transmission joint bowl 13, and are designed so that they never present sharp edges toward the below forced over them. Of course, inner edges can be provided, in the form of curved fluting or tubular structures so as to prevent the cone from moving along with the sheath as it passes over the "bowl". With the mounting cones known in the art, the lubricated sheath tends to move toward the small diameter. To remedy this, the installation device according to the invention has a cylindrical section 27 extending the end of the cone having the smaller diameter, and on which the sheath can be placed prior to fixing it in position, which facilitates the mounting operation (FIGS. 10 and 11).

The advantages of this device, as in the previous embodiment, are several:

A single cone can be used for all articulated joints.
  Minimal effort is required to force the passage of the flexible sheath, regardless of the diameter to be crossed.
  It can be molded in a single piece.

According to a third variant of an embodiment, the flexible sheath has a built-in mounting cone 28, the cone and the sheath being molded in a single piece are integral, either by two-material flexible injection utilises a material for the sheath, and a semi-rigid material for the cone- or by single-material injection. The sheath, on its small diameter side, is extended by a slit or a closed cone that is smooth or striated, and may have a sawtooth structure, or be ridged. During mounting, the cone is placed on the bowl 13 of the articulated joint, and the sheath is turned back on itself before being forced over the built-in cone 28, thus the cone permits smooth extension of the sheath over the bowl. The installer may disconnect the cone from the sheath by a simple cutting action either before or after passage over the bowl of the articulated joint (FIG. 12).

The positioning of the various constitutive elements gives the object of the invention a maximum number of advantages that have not been achieved so far through similar devices.

What is claimed is:

1. A flexible sheath comprising:
   a conical central bellows for an articulated joint for protecting lubricated joints and for transmitting movement to mobile members;
   said flexible sheath further comprising a tubular element;
   wherein the tubular element further comprises at least one fixing zone on each end;
   said tubular element further comprising said conical central bellows;
   each said at least one fixing zone further comprising an outer clamping surface for receiving a clamp and an inner surface comprising at least one attachment rib,
   wherein the at least one attachment rib is located on the inner surface of the at least one fixing zone at a position other than a middle of the outer clamping surface and offset towards the conical central bellows.

2. The flexible sheath of claim 1, wherein the outer surface of said at least one fixing zone comprises circular grooves for transmitting differential compressions and improving leak tightness.

3. A combination comprising:
   a steering rack; and
   at least two protective sheaths for a steering rack, each of said at least two protective sheaths comprising:
   a flexible connector having an open end provided with several sections of different diameters for compensating for the differences in pressure that exist between the two protective sheaths, each protective sheath having a bellows mounted at each end of the steering rack;
   wherein one end of the flexible connector includes a cap which is integral with the wall of the sheath such that it can be easily removed or pierced when used on a power steering, so as to enable the sheath to be mounted on non-assisted mechanical racks.

4. The flexible sheath of claim 1, wherein the conical bellows comprises a plurality of folds each having sloping flanks defined by asymmetrical angles with respect to the longitudinal axis of the sheath;
   said angles facilitating movement, when the bellows is subject to rotation or bending movements, of any lubricant contained in the sheath toward a large diameter end of the sheath.

5. A device for installing a flexible sheath on an articulated joint comprising:
   one of, a flexible or ductile mounting cone;
   said mounting cone having a base diameter for installing a sheath;
   said sheath having different diameters of articulations for use in transmission joints or steering rack cases.

6. The device of claim 5, wherein the mounting cone comprises a semi-rigid circular foil made by the process of:
   cutting a circular shape from flat sheet stock;
   punching a center hole;
   removing a pie shaped section; and
   wrapping the foil to form a cone that can be placed on an articulated joint or steering arm in order to facilitate installation of the protective sheath.

7. The device of claim 5, wherein the mounting cone comprises a section of hollow sawteeth such that the sawteeth can relax or retract as a function of the diameter of the articulated joint, and wherein the sheath is devoid of sharp edges which can damage the flexible sheath while it is being installed.

8. The device of claim 7, wherein the mounting cone comprises a cylindrical section extending to a small diameter end for accommodating the flexible sheath prior to its installation.

9. The device of claim 5, wherein the mounting cone and flexible sheath are interally molded in a single piece by any one of the following methods:
   by two-material injection, flexible for the sheath and semi-rigid for the cone, or
   by single-material injection, said cone extending said sheath on the small diameter side and capable of being separated from it by a simple cutting action, either before or after it is fixed in position.

10. The device of claim 5, wherein the mounting cone comprises stops on its inner face for engaging the articulated joint in order to prevent the cone from being moved by the flexible sheath;
    wherein said stops are integrally molded with the cone.

11. The flexible sheath of claim 1, wherein the lubricated joints comprise at least one of: universal joints, constant velocity joints, three-ball-and-trunnion universal joints, ball joints, socket joints, or similar joints.

12. The flexible sheath of claim 1, wherein the articulated joint comprises mobile members, said mobile members comprising steering racks used for motor vehicle replacement equipment.

13. A flexible sheath for an articulated joint comprising:
    a centrally located conical bellows;
    said sheath further comprising a tubular element for retaining contents therein and formed with at least two fixing zones on at least one end;
    said tubular element having an inside surface and an outside surface; and
    one of the two fixing zones having a different diameter than a diameter of another of the two fixing zones,
    at least one of the two fixing zones further comprising an outer clamping surface for receiving a clamp and an inner surface comprising at least one attachment rib,
    wherein the at least one attachment rib is located on the inner surface of the at least one fixing zone at a position other than a middle of the outer clamping surface and offset towards the conical central bellows.

14. The flexible sheath of claim 13, wherein the at least one attachment rib is located on the inside surface of each fixing zone.

15. The flexible sheath of claim 13, further comprising at least one external attachment being located on the outside surface of the at least one fixing zone.

16. The flexible sheath of claim 13, wherein the outside surface of at least one fixing zone comprises a clamping area having sides of greater diameter than the outside surface of the at least one fixing zone.

17. The flexible sheath of claim 13, wherein the outside clamping surface has at least one circular groove formed therein for transmitting differential compressions suitable for reducing leakage.

18. The flexible sheath of claim 13, wherein the conical bellows further comprises a plurality of sections having varying cylindrical diameters.

19. The flexible sheath of claim 11, wherein the sheath further comprises a flexible connector for pressure compensation.

20. The flexible sheath of claim 19, wherein the flexible connector is closed by a cap.

21. The flexible sheath of claim 19, wherein the sheath is formed integrally with a flexible connector.

22. The flexible sheath of claim 13, wherein the conical bellows further comprises folds.

23. The flexible sheath of claim 22, wherein the sheath contains a lubricant and the folds comprising sloping flanks are formed at asymmetrical angles with respect to the longitudinal axis of the sheath;
wherein the angles facilitate the lubricant contained with the sheath to move in the direction of greater diameter.

24. A mounting cone for installing a flexible sheath on an articulated joint comprising:
a tapered tubular member which is, one of, flexible or ductile;
said tapered tubular member having at least one integrally formed stop for engaging the articulated joint;
wherein the mounting cone facilitates the installation of a flexible sheath on an articulated joint.

25. The mounting cone of claim 24, wherein the tubular member comprises a semi-rigid circular sheet having a pie shaped section removed.

26. The mounting cone of claim 25, wherein the semi-rigid circular sheet comprises a foil.

27. A mounting cone for installing a flexible sheath on an articulated joint comprising:
a tapered tubular member which is, one of, flexible or ductile;
said tapered tubular member having a plurality of integrally formed hollow sawteeth;
wherein the hollow sawteeth can relax or retract as a function of the diameter of the articulated joint.

28. The mounting cone of claim 27, wherein the tapered tubular member is integrally formed with the flexible sheath.

29. The mounting cone of claim 28, wherein the tubular member and flexible sheath are injection molded.

30. The mounting cone of claim 29, wherein the tubular member and flexible sheath are separable from one another.

31. The mounting cone of claim 30, wherein the tubular member and flexible sheath are separable from one another by cutting.

32. The mounting cone of claim 27, wherein the tapered tubular member has at least one integrally formed stop for engaging the articulation joint.

33. The mounting cone of claim 32, wherein the at least one integrally formed stop for engaging the articulation joint is disposed on the inside surface of the tubular member.

* * * * *